(No Model.)  2 Sheets—Sheet 1.

C. J. BEST.
CRUCIBLE FURNACE.

No. 581,389. Patented Apr. 27, 1897.

Witnesses.
E. T. Wray.
Lilley H. Johnstone.

Inventor.
Charles J. Best
By Francis W. Parker,
Atty.

(No Model.) 2 Sheets—Sheet 2.
C. J. BEST.
CRUCIBLE FURNACE.
No. 581,389. Patented Apr. 27, 1897.
Fig. 5.
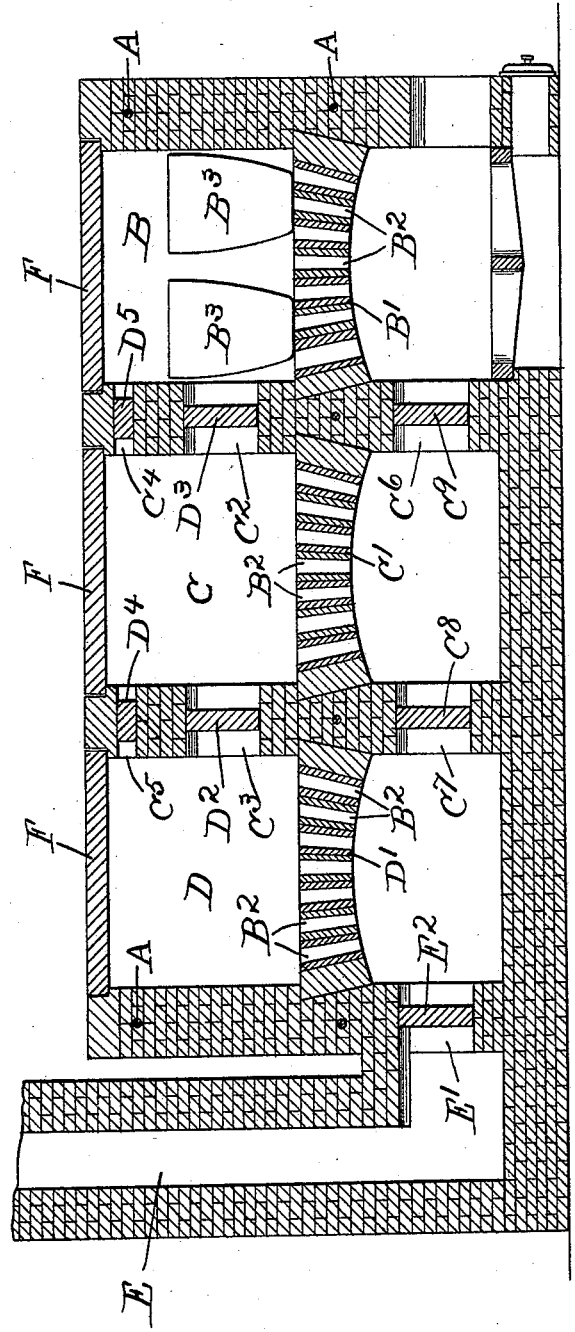
Fig. 4.
Witnesses.
E. T. Wray
Lilley H. Johnstone.
Inventor.
Charles J. Best
By Francis W. Parker
Atty.

UNITED STATES PATENT OFFICE.

CHARLES J. BEST, OF CHICAGO, ILLINOIS, ASSIGNOR OF ONE-HALF TO JOHN H. VOGT, OF SAME PLACE.

CRUCIBLE-FURNACE.

SPECIFICATION forming part of Letters Patent No. 581,389, dated April 27, 1897.

Application filed July 9, 1896. Serial No. 598,576. (No model.)

*To all whom it may concern:*

Be it known that I, CHARLES J. BEST, a citizen of the United States, residing at Chicago, in the county of Cook and State of Illinois, have invented a certain new and useful Improvement in Crucible-Furnaces, of which the following is a specification.

My invention relates to furnaces for treating metals, and has for its object to provide a new and improved furnace, of which the following is a description, reference being had to the accompanying drawings, wherein—

Figure 1:
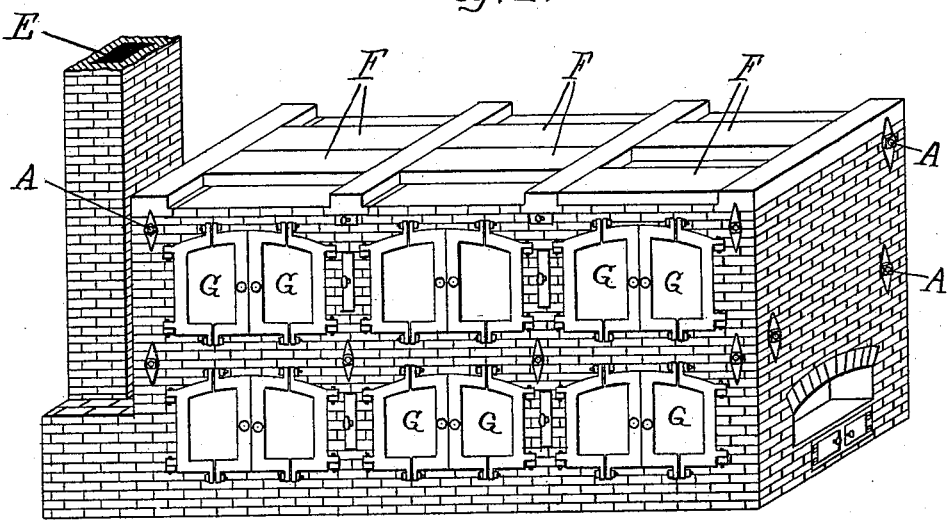
Figure 2:
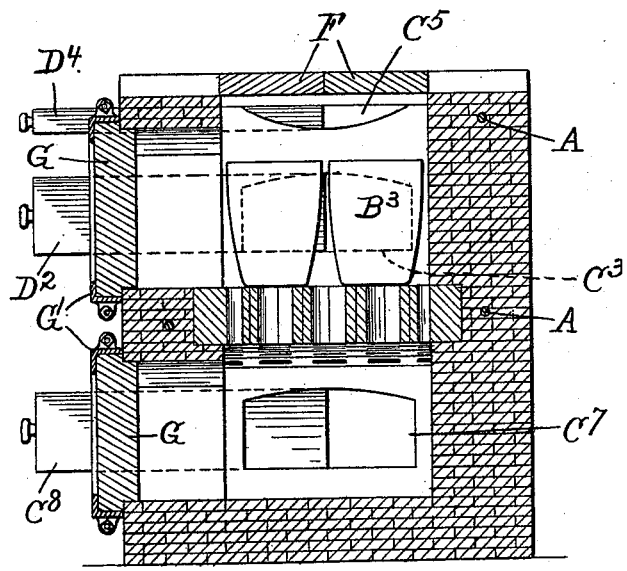
Figure 3:
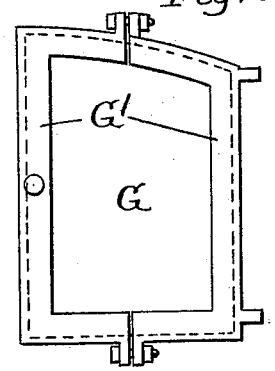

Figure 1 is a perspective view of a furnace embodying my invention. Fig. 2 is a cross-section through the furnace. Fig. 3 is an enlarged detailed view of one of the furnace-doors. Fig. 4 is a longitudinal section through the furnace. Fig. 5 is a view of one of the bricks used in the floor or partition upon which the crucibles rest.

Like letters refer to like parts throughout the several figures.

My furnace is particularly adapted for treating iron, steel, or the like in crucibles, and is provided with a series of chambers, such chambers being provided with controlling devices, so that the heat therein may be regulated and controlled. Referring to the drawings, this furnace is preferably made of fire-clay made into the form of bricks and slabs and the outer walls are held together by means of tie-rods A, said tie-rods preventing the walls from being sprung by the heat.

The furnace is divided up by means of walls into a series of chambers. I have illustrated in the drawings a furnace containing three chambers, but it is of course evident that more or less chambers may be used, if desired.

Each of the chambers B, C, and D is divided by means of the partitions B' C' D'. These partitions are made up of a series of bricks or the like provided with the opening $B^2$, through which the heat passes. These partitions act as the floors through which the crucibles $B^3$ rest and are constructed in any suitable manner, being preferably constructed flat on the top. In the drawings I have shown these floors or partitions as being arched beneath. The chambers having the partitions are connected by means of openings $C^2$ $C^3$ $C^4$ $C^5$. The openings between the chambers below the partitions are controlled by the slides $C^8$ $C^9$ and the openings above the partitions are controlled by the slides $D^2$ $D^3$ $D^4$ $D^5$. The lower part of the chamber D is connected with the chimney E by the opening E', controlled by the slide $E^2$, the lower part of the chamber B containing the fire by which the heat is produced and is provided with doors and grate-bars in the ordinary manner.

Each of the chambers B, C, and D is provided with two sliding doors F F, made of fire-clay. These doors are adapted to completely cover the chamber when in position, but may be moved to one side, so as to rest upon the top of the outer wall of the furnace and leave the chamber completely open at the top. I also provide both the upper and lower part of each chamber with the side doors G G. These doors may be made in any desirable manner, but I prefer to make them of slabs of fire-clay, the fire-clay being surrounded by the metallic frame G', provided with the hinges upon which the doors are suspended.

I have shown the openings in the wall which separate the various chambers (see Fig. 2) as being arch-shaped, but it is evident these openings may be of any shape and may be controlled in any other manner desired, the object being to provide a furnace with a series of chambers which would be under complete control.

I have described the several parts in detail, but it is evident they may be greatly varied in form, construction, and arrangement without departing from the spirit of my invention, and I therefore do not wish to be limited to the construction herein shown and described.

The use and operation of my invention are as follows:

It has been difficult heretofore to provide a crucible-furnace with more than one or at the most two chambers, which would be hot enough to successfully treat the metal.

The object of my invention is to provide a furnace having a series of chambers, the furnace being so constructed and provided with such controlling devices that the heat in any of the chambers can be regulated at will, each and all of the chambers being used for the heating of the metal, if desired.

The floors are partitions in the chambers, upon which the crucibles rest, and are provided with a series of openings or perforations therein, allowing the flame and heat to make direct contact with the bottom of the crucibles.

It will be seen that by means of the several controlling and regulating devices associated with my furnace I can send the heat into any of the chambers I desire and can regulate the amount of heat received by such chamber. If, for example, it is desired to direct a large amount of heat into chamber C, the slide $D^3$ would be moved, so as to fully open the opening $C^2$.

If it is desired to force the flame and heated gases down upon the top of the crucibles in chamber C, the slide $D^3$ is closed and the slide $D^5$ is open. It will be seen that when these conditions exist the flames and heated gases pass over the top of the wall separating the chambers B and C and are forced down upon the top of the crucibles in the chamber C. If it is desired to heat these crucibles very rapidly, the slides $D^2$ and $D^4$ are closed, thereby forcing the heated gases down through the openings $B^2$ in the floor or partition of the chamber C.

If the slide $C^3$ is closed, the heated gases and flame may be forced into chamber D, either at the top or through the opening $C^3$, by moving the slides $D^4$ or $D^2$. If the slides $D^3$ and $D^5$ are closed, it will be seen that very little heat will enter the chamber B and that the heat developed by the fire can be sent into any chamber desired and in the degree desired. It will therefore be seen that I have here a furnace provided with a series of chambers which are under complete control, so that the heat in each and every one of such chambers can be controlled and regulated, and that the heated gases and flame can be made to come in contact with practically all the surfaces of the crucibles, including the bottoms of such crucibles. The crucibles with the metal in them are removed and inserted through the opening at the top of the chamber by means of the slide-doors F F.

The lower part of the chambers C and D may be used for any purpose—as, for example, the heating of the crucibles before they are placed in the upper chamber. Any of these upper chambers may also be used for this purpose, as the heat therein may be regulated at will.

I claim—

1. A furnace for treating metals or the like comprising a series of chambers provided with perforated floors intermediate between the top and bottom thereof and adapted to support the crucibles containing the material to be treated the dividing-walls of said chambers provided with openings above the floor one near the top of said wall and another intermediate between the top of the wall and the floor and controlling devices for said openings.

2. A furnace for treating metals or the like comprising a series of chambers provided with perforated floors intermediate between the top and bottom thereof and adapted to support the crucibles containing the material to be treated, the dividing-walls of said chambers provided with openings above the floor one near the top of said wall and another intermediate between the top of the wall and the floor and controlling devices for said openings the dividing-walls below the floors being also provided with controllable openings.

CHARLES J. BEST.

Witnesses:
JEAN ELLIOTT,
LILLEY JOHNSTONE.